(12) United States Patent
Schroeder

(10) Patent No.: US 8,590,840 B2
(45) Date of Patent: Nov. 26, 2013

(54) BOOM FORCE ABSORBER SYSTEMS AND METHODS FOR AERIAL REFUELING

(75) Inventor: Steven B. Schroeder, Derby, KS (US)

(73) Assignee: The Boeing Company, Chicago, IL (US)

(*) Notice: Subject to any disclaimer, the term of this patent is extended or adjusted under 35 U.S.C. 154(b) by 2022 days.

(21) Appl. No.: 11/557,892

(22) Filed: Nov. 8, 2006

(65) Prior Publication Data

US 2010/0025536 A1    Feb. 4, 2010

(51) Int. Cl.
*B64D 37/02* (2006.01)
*B64D 37/04* (2006.01)
*B64D 37/12* (2006.01)

(52) U.S. Cl.
USPC ..................................................... 244/135 R

(58) Field of Classification Search
USPC ................................. 244/1 TD, 135 A, 135 R
See application file for complete search history.

(56) References Cited

U.S. PATENT DOCUMENTS

| | | | | |
|---|---|---|---|---|
| 1,818,138 A | * | 8/1931 | Howland | 244/3 |
| 1,848,372 A | * | 3/1932 | Moran | 244/135 A |
| 2,287,257 A | * | 6/1942 | Lear | 188/268 |
| 2,663,523 A | * | 12/1953 | Leisy | 244/135 A |
| 2,716,527 A | * | 8/1955 | Latimer-Needham | 244/3 |
| 2,852,216 A | * | 9/1958 | Peters | 244/135 A |
| 3,976,100 A | * | 8/1976 | Souslin | 137/614.03 |
| 6,398,198 B1 | | 6/2002 | Okamoto | |
| 6,651,933 B1 | | 11/2003 | von Thal et al. | |
| 6,905,126 B1 | | 6/2005 | Jurrens | |
| 6,966,525 B1 | | 11/2005 | Schroeder | |
| 7,077,052 B2 | | 7/2006 | Lloyd | |
| 2003/0205643 A1 | * | 11/2003 | von Thal et al. | 244/135 A |
| 2004/0221404 A1 | * | 11/2004 | Bender et al. | 14/69.5 |
| 2006/0038076 A1 | * | 2/2006 | Schroeder | 244/135 A |
| 2006/0278762 A1 | * | 12/2006 | Schroeder | 244/135 A |

* cited by examiner

*Primary Examiner* — Philip John Bonzell

(57) ABSTRACT

Systems and methods for aerial refueling are disclosed. In one embodiment, an aerial refueling system includes a first conduit portion moveably coupled to a second conduit portion and moveable relative to the second conduit portion along a longitudinal axis, and a force absorbing assembly operatively coupled to the first and second conduit portions. The force absorbing assembly includes a first absorber portion and a second absorber portion engaged with the first absorber portion. The first absorber portion is configured to compress when subject to a compression force having a longitudinal component at least approximately aligned with the longitudinal axis, the longitudinal component tending to urge the first conduit portion toward the second conduit portion and causing absorption of at least a portion of the longitudinal component by the first absorber portion until the longitudinal component reaches a first limit. The second absorber portion is configured to compress when the longitudinal component exceeds the first limit.

17 Claims, 6 Drawing Sheets

BOOM FORCE ABSORBER SYSTEMS AND METHODS FOR AERIAL REFUELING

FIELD OF THE INVENTION

The present invention generally relates to aerial refueling, and more specifically, to systems and methods that reduce incidental impact forces exerted by a refueling boom during aerial refueling.

BACKGROUND OF THE INVENTION

Aircraft in flight are commonly refueled from a refueling aircraft. Many refueling aircraft use a system of fixed and extendable tubing, often referred to as a refueling boom, for refueling a receiving aircraft. Typically, an operator in the refueling aircraft controls the refueling boom into alignment with the receiving aircraft, either visually or with the assistance of camera equipment. The refueling boom typically has control surfaces (fins or airfoils) to allow the refueling operator to "fly" the refueling boom into engagement with a refueling receptacle on the receiving aircraft. A distal end of the refueling boom may be extendable to allow the operator to extend the refueling boom into engagement with the refueling receptacle. Examples of prior art aerial refueling systems include those systems described in U.S. Pat. No. 6,966,525 B1 issued to Schroeder, and U.S. Pat. No. 6,651,933 B1 issued to von Thal et al.

Although desirable results have been achieved using such prior art systems, there is room for improvement. For example, as the refueling boom is being positioned for insertion into the refueling receptacle on the receiving aircraft, the refueling boom may inadvertently contact portions of the receiving aircraft other than the refueling receptacle. Such inadvertent contacts may result in damage to the receiving aircraft and to the refueling boom. Existing devices for absorbing boom forces that may be exerted between the refueling aircraft and the receiving aircraft through the boom are typically configured to operate when such forces reach relatively high magnitudes (e.g. several thousand pounds of compression force) and are intended to avert potentially extreme or catastrophic events. Such existing devices do not alleviate damages that may result from relatively lower magnitude forces that result from relatively normal, incidental contacts between the boom and the receiving aircraft that typically occur in day-to-day aerial refueling operations.

SUMMARY OF THE INVENTION

Embodiments of systems and methods for aerial refueling in accordance with the present invention are configured to absorb compression forces experienced by a refueling boom. More specifically, embodiments of the present invention may advantageously absorb both relatively large compression forces (typically associated with potentially extreme events), as well as relatively smaller compression forces that result from normal, incidental contacts that occur in day-to-day aerial refueling operations. In this way, embodiments of systems and methods in accordance with the present invention may reduce operational expenses associated with repairs of aircraft and in-flight refueling assemblies, in comparison with prior art aerial refueling systems.

In one embodiment, an aerial refueling system includes a first conduit portion moveably coupled to a second conduit portion and moveable relative to the second conduit portion along a longitudinal axis, and a force absorbing assembly operatively coupled to the first and second conduit portions. The force absorbing assembly includes a first absorber portion and a second absorber portion engaged with the first absorber portion. The first absorber portion is configured to compress when subject to a compression force having a longitudinal component at least approximately aligned with the longitudinal axis, the longitudinal component tending to urge the first conduit portion toward the second conduit portion and causing absorption of at least a portion of the longitudinal component by the first absorber portion until the longitudinal component reaches a first limit. The second absorber portion is configured to compress when the longitudinal component exceeds the first limit.

In alternate embodiments, the first and second conduit portions form an internal passage, and at least one of the first and second absorber portions includes at least one of a coil spring disposed about the internal passage, a plurality of fluidic shock absorbers concentrically disposed about the internal passage, a plurality of springs concentrically disposed about the internal passage, a tubular resilient member concentrically disposed about the internal passage, and an inflatable member concentrically disposed about the internal passage.

In another embodiment, a refueling boom assembly includes a base portion having a first passage configured to receive a fuel stream; an extendible portion having a second passage fluidly coupled to the first passage and configured to receive the fuel stream; and a compression absorber assembly operatively coupled to at least one of the base and extendible portions. The compression absorber assembly includes a first conduit portion moveably coupled to a second conduit portion and moveable relative to the second conduit portion along a longitudinal axis, the first and second conduit portions being configured to receive the fuel stream; and a force absorbing assembly operatively coupled to the first and second conduit portions. The force absorbing assembly includes a first absorber portion and a second absorber portion engaged with the first absorber portion. The first absorber portion is configured to compress when subject to a compression force having a longitudinal component at least approximately aligned with the longitudinal axis, the longitudinal component tending to urge the first conduit portion toward the second conduit portion and causing absorption of at least a portion of the longitudinal component by the first absorber portion until the longitudinal component reaches a first limit. The second absorber portion is configured to compress when the longitudinal component exceeds the first limit.

In still another embodiment, an aerial refueling aircraft includes a fuselage; a fuel tank disposed within the fuselage; and a refueling boom assembly operatively coupled to the fuselage and fluidly coupled to the fuel tank. The refueling boom assembly includes a base portion having a first passage configured to receive a fuel stream; an extendible portion having a second passage fluidly coupled to the first passage and configured to receive the fuel stream; and a compression absorber assembly operatively coupled to at least one of the base and extendible portions, the compression absorber assembly including: a first conduit portion moveably coupled to a second conduit portion and moveable relative to the second conduit portion along a longitudinal axis, the first and second conduit portions being configured to receive the fuel stream; and a force absorbing assembly operatively coupled to the first and second conduit portions and having a first absorber portion and a second absorber portion engaged with the first absorber portion. The first absorber portion is configured to compress when subject to a compression force having a longitudinal component at least approximately aligned with the longitudinal axis, the longitudinal component tending to urge the first conduit portion toward the second conduit portion and causing absorption of at least a portion of the longitudinal component by the first absorber portion until the longitudinal component reaches a first limit. The second absorber portion is configured to compress when the longitudinal component exceeds the first limit.

In another alternate embodiment, a method of aerial refueling comprises providing a first conduit portion moveably coupled to a second conduit portion and moveable relative to the second conduit portion along a longitudinal axis; providing a force absorbing assembly operatively coupled to the first and second conduit portions; absorbing a longitudinal component of a compression force using a first absorber portion of the force absorbing assembly, the longitudinal component being approximately aligned with the longitudinal axis and tending to urge the first conduit portion toward the second conduit portion; and after the longitudinal component exceeds a first limit, compressing a second absorber portion of the force absorbing assembly operatively engaged with the first absorber portion.

BRIEF DESCRIPTION OF THE DRAWINGS

Embodiments of the present invention are described in detail below with reference to the following drawings.

DETAILED DESCRIPTION

The present invention relates to methods and systems for aerial refueling that absorb compression forces experienced by a refueling boom. Many specific details of certain embodiments of the invention are set forth in the following description and in FIGS. 1-11 to provide a thorough understanding of such embodiments. One skilled in the art, however, will understand that the present invention may have additional embodiments, or that the present invention may be practiced without several of the details described in the following description.

In general, embodiments of systems and methods in accordance with the present invention may advantageously absorb both relatively high magnitude compression forces, as well as relatively lower magnitude compression forces that result from relatively normal, incidental contacts that occur in day-to-day aerial refueling operations. Thus, embodiments of the invention may reduce damage to receiving aircraft due to incidental contacts between the refueling boom 114 and portions of the receiving aircraft 120, such as the fuselage, cockpit windows, antenna, and other portions of the receiving aircraft 120. Operational costs associated with repairs of aircraft and aerial refueling systems, and expenses associated with aircraft downtime, may thereby be reduced.

Figure 1:
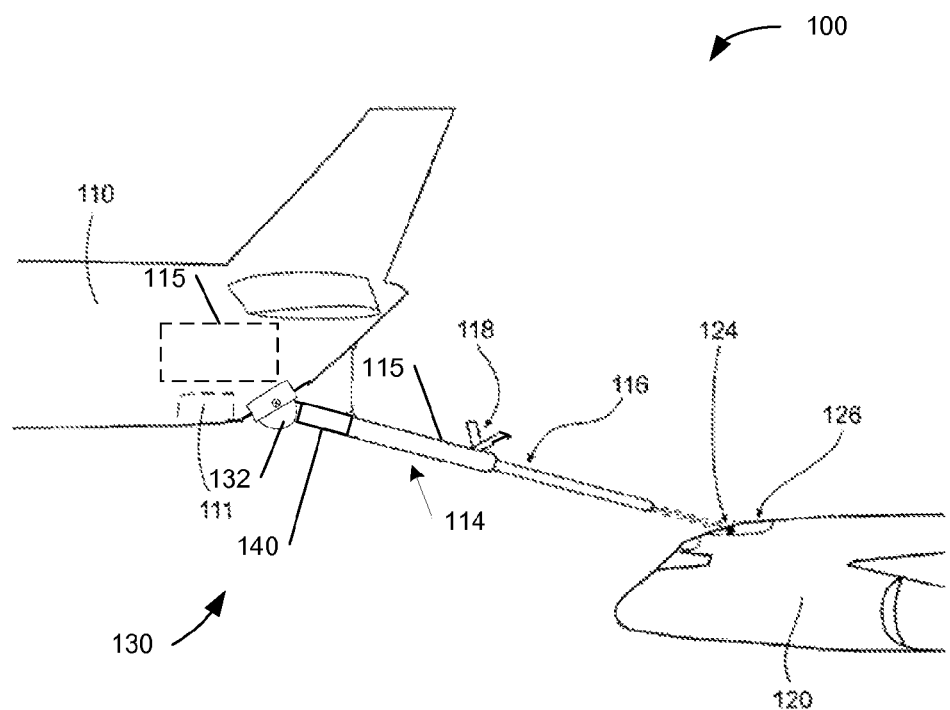
FIG. 1 is a side elevational view of an aerial refueling system in accordance with an embodiment of the invention.

FIG. 1 is a side elevational view of an aerial refueling system 100 in accordance with an embodiment of the present invention. In this embodiment, a refueling aircraft (or tanker) 110 is equipped with an in-flight refueling assembly 130 that includes a refueling boom 114. The refueling boom 114 is configured to be guided into alignment with a refueling receptacle 126 of a receiving aircraft 120. The refueling boom 114 includes a base portion 115 and an extendable portion 116 that may be extended into engagement with (and retracted from) the refueling receptacle 126, fluidly coupling the refueling aircraft 110 with the receiving aircraft 120.

In some embodiments, the refueling aircraft 110 is a KC-135 Stratotanker, or a KC-767 Global Tanker Transport Aircraft, manufactured by The Boeing Company of Chicago, Ill. Alternately, the refueling aircraft 110 may be any suitable refueling aircraft, including an automated refueling aircraft such as the experimental F/A-18A "tanker" aircraft operated by the NASA Dryden Research Center, or any tanker aircraft that partially or fully satisfies the specifications of the KC-X Aerial Refueling Tanker Aircraft program conducted by the U.S. Department of the Air Force, or the Future Strategic Tanker Aircraft program conducted by the Royal Air Force of the United Kingdom, or any other suitable type of manned or unmanned aerial refueling aircraft.

Figure 2:
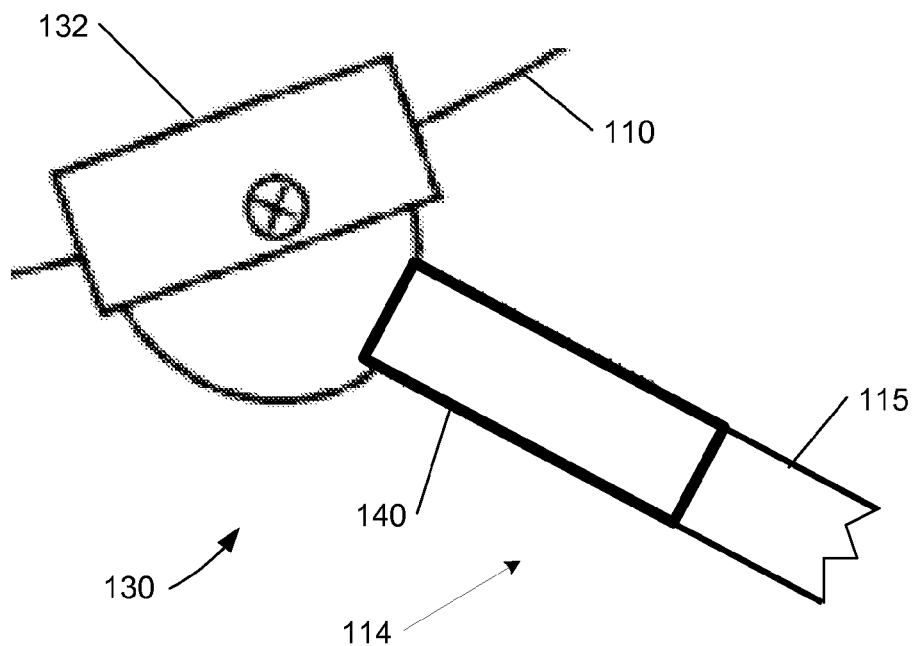
FIG. 2 is an enlarged side elevational view of a portion of an in-flight refueling assembly of the aerial refueling system of FIG. 1.

FIG. 2 is an enlarged side elevational view of the in-flight refueling assembly 130 of FIG. 1. In this embodiment, a gimble assembly 132 is coupled to the refueling boom 114, enabling a controller 111 to controllably adjust the position of the refueling boom 114. In some embodiments, the refueling boom 114 may be guided into alignment with the refueling receptacle 126 by adjusting one or more airfoils 118 disposed on the refueling boom 114. The controller 111 may be a human operator, or alternately, may be an automated or semi-automated control device that includes one or more processors (or other computer devices) configured to adjustably control the position of the refueling boom 114. The control device may further include input and output devices such that an operator of the in-flight refueling system 100 may monitor and override the operation of the controller 111. The controller 111 may be in communication with the airfoils 118 via various devices and methods suitable for controlling the airfoils 118, including hydraulic lines, electromechanical devices, electronic or wireless connections, or any other suitable control devices.

As further shown in FIGS. 1 and 2, the in-flight refueling assembly 130 includes a boom force absorber assembly 140 coupled between the gimble assembly 132 and the refueling boom 114. The boom force absorber assembly 140 is configured to alleviate damages that may result from relatively lower magnitude forces that result from relatively normal, incidental contacts between the refueling boom 114 and the receiving aircraft 120 that typically occur in day-to-day aerial refueling operations.

Figure 3:
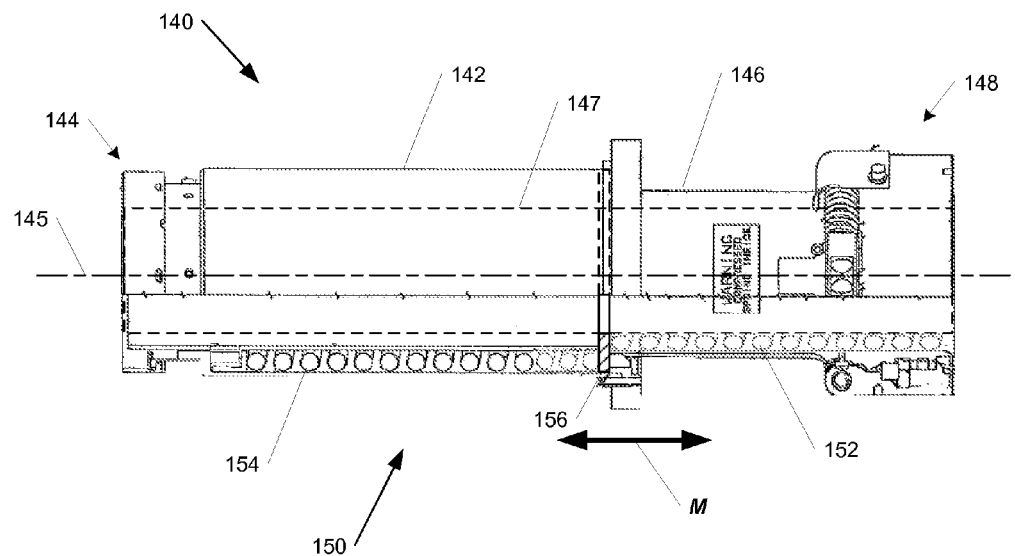
FIG. 3 is an enlarged, partial cross-sectional view of a boom force absorber assembly in accordance with an embodiment of the invention.

More specifically, FIG. 3 is an enlarged, partial cross-sectional view of the boom force absorber assembly 140 in accordance with one embodiment of the invention. In this embodiment, the boom force absorber assembly 140 includes a first housing 142 having a first end 144 configured to be coupled to the gimble assembly 132, and a second housing 146 having a second end 148 configured to be coupled to the refueling boom 114. The first and second housings 142, 146 are aligned along a longitudinal axis 145 and moveably coupled such that the second housing 146 may move axially along the longitudinal axis 145 relative to the first housing 142 (or vice versa) as depicted by double-headed arrow M. For example, in some embodiments, a portion of the second housing 146 slidably engages into the first housing 142 (or vice versa). The first and second housings 142, 146 are also configured to define an internal passage 147 that extends through the boom force absorber assembly 140. The internal passage 147 fluidly couples the refueling boom 114 with the gimble assembly 132 or one or more other components that are, in turn, fluidly coupled to a fuel tank 115 (FIG. 1) within the refueling aircraft 110.

Figure 5:
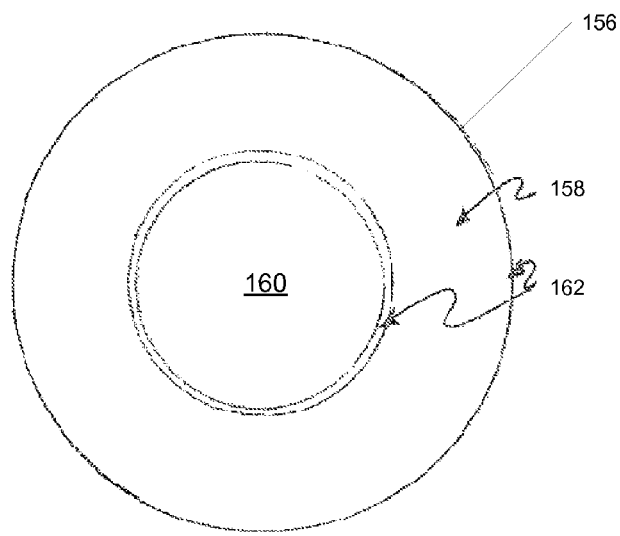
FIG. 5 is a front elevational view of a load transfer plate of the boom force absorber assembly of FIG. 3.

In this embodiment, the boom force absorber assembly 140 also includes a compressible assembly 150 having an insertion spring 152 disposed in the second housing 146, and a primary spring 154 disposed in the first housing 142. A load transfer plate 156 is disposed between the insertion spring 152 and the primary spring 154. As best shown in FIG. 5, in one embodiment, the load transfer plate 156 includes an approximately flat ring-shaped member 158 having a central aperture 160 disposed therethrough. The central aperture 160 is configured to receive the internal passage 147. Layers 162 of relatively low friction material may be applied to the inner and outer edges of the ring-shaped member 158 to reduce wear due to friction as the ring-shaped member 158 moves within the first housing 142 (or second housing 146) along the longitudinal axis 145 (arrow M).

The compressible assembly 150 is advantageously configured to absorb relatively high magnitude compression forces (e.g. several hundred or several thousand pounds of compression force) typically associated with potentially extreme or catastrophic events, as well as relatively lower magnitude forces (e.g. up to and including a couple of hundred pounds of compression force) that result from relatively normal, incidental contacts between the refueling boom 114 and the receiving aircraft 120 that typically occur in day-to-day aerial refueling operations. In the embodiment shown in FIG. 3, this is accomplished by having different spring constants for the primary and insertion springs 154, 152. For example, in some embodiments, the insertion spring 152 is configured to absorb relatively lower magnitude compression forces, and the primary spring 154 is configured to absorb relatively higher magnitude compression forces.

More specifically, in some embodiments, the insertion spring 152 is configured to absorb up to approximately 100 pounds of compression force, corresponding to an insertion and extraction force design criteria of a Universal Aerial Refueling receptacle presently used on many types of modern military aircraft. Similarly, in some embodiments, the primary spring 154 is configured to absorb approximately 3000 pounds, a force magnitude conventionally used as a design criteria for abnormal, relatively extreme compression forces within the refueling boom 114. Of course, in alternate embodiments, the insertion spring 152 and the primary spring 154 may be configured to absorb other magnitudes of compression forces corresponding to different circumstances and designs of aerial refueling receptacles, and correspondingly different anticipated compression forces.

Figure 4:
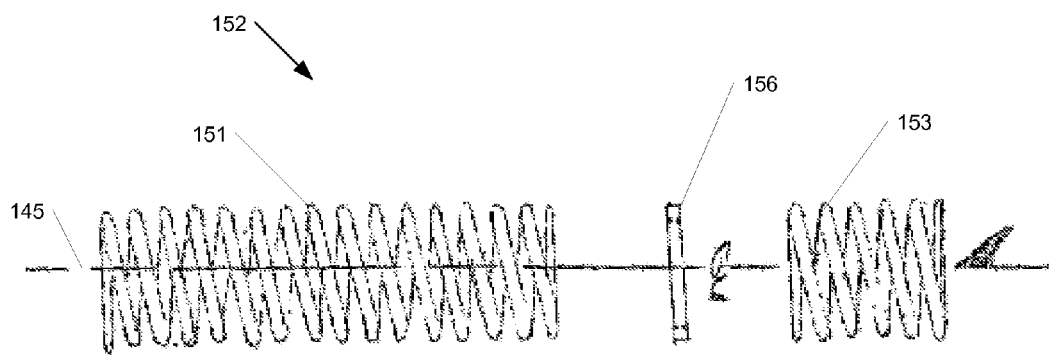
FIG. 4 is a partially-exploded side elevational view of a compressible assembly of the boom force absorber assembly of FIG. 3.

In an alternate embodiment, the insertion spring 152 may be replaced with two or more springs. For example, FIG. 4 is a partially-exploded view of an embodiment of the compressible assembly 150 wherein the insertion spring 152 has been replaced by a first spring 151 and a second spring 153. Another load transfer plate 156 is disposed between the first and second springs 151, 153. In this embodiment, the first spring 151 may be configured to absorb compression forces between a lower limit (e.g. approximately 100 pounds) and an upper limit (e.g. approximately 1000 pounds) of compression force, and the second spring 153 may be configured to absorb a relatively smaller magnitude, such as up to a lower limit at which the first spring 151 begins to compress (e.g. up to 100 pounds). In one specific embodiment, the first spring 151 is configured to absorb between approximately 100 pounds and 720 pounds of compression force, and the second spring is configured to absorb up to approximately 100 pounds of compression. Of course, in further embodiments, either the primary spring 154 or the insertion spring 152, or both, may comprise a plurality of springs. Also, in the embodiment shown in FIG. 4, the second spring 153 may be configured to approximately match an insertion forces of a standard refueling receptacle 124, while the first spring 151 may be configured to provide a relatively small amount of additional spring force that may be needed in case the extendible portion 116 of the refueling boom 114 does not latch with the refueling receptacle 124. In such a case, the first spring 151 maintains contact between the refueling boom 114 and the refueling receptacle 124 in a practice referred to as "forced refueling."

In operation, the controller 111 may lower the in-flight refueling boom 114 to await the rendezvous of the receiving aircraft 120 with a position substantially aft and below the refueling aircraft 110. The controller 111 may maintain the position of the in-flight refueling boom 114 relative to the refueling aircraft 110 while awaiting the approach of the receiving aircraft 120. As the controller 111 guides the refueling boom 114 into engagement with the refueling receptacle 126 of the receiving aircraft 120, incidental contacts between the refueling boom 114 and portions of the receiving aircraft 120 create relatively lower magnitude compression forces within the in-flight refueling assembly 130 which are absorbed by the insertion spring 152 of the boom force absorption assembly 140.

Once the refueling boom 114 is in a position suitable for engagement with the refueling receptacle 126, the controller 111 may extend the extendable portion 116 of the refueling boom 114 to engage the refueling boom 114 with the refueling receptacle 126. Assuming an approximately linear alignment between the refueling boom 114 and the refueling receptacle 126, in those embodiments in which the insertion spring 152 is configured to approximately match an insertion force design criteria of the refueling receptacle 126, the insertion force necessary to insert the refueling boom 114 into the refueling receptacle 126 may be approximately absorbed by the insertion spring 152, creating a "zero force" insertion condition within the in-flight aerial refueling assembly 130.

In the event that a greater-than-nominal compression force is experienced by the refueling boom 114, the insertion spring 152 may become mostly or completely compressed, and the greater-than-nominal compression force acting through the load transfer plate 156 may begin compressing the primary spring 154. For example, if the insertion spring 152 is configured to absorb up to 100 pounds, and a compression force of 500 pounds is experienced within the refueling boom 114, the insertion spring 152 may become mostly or completely compressed, and the compression force of 500 pounds may begin compressing the primary spring 154. In this way, the boom force absorption assembly 140 may be configured to absorb both relatively high magnitude compression forces (typically associated with potentially extreme events), as well as relatively lower magnitude forces that result from relatively normal, incidental contacts that occur in day-to-day aerial refueling operations.

After the refueling boom 114 is engaged with the refueling receptacle 126, in-flight aerial refueling may be performed. More specifically, the controller 111 may cause fuel to flow from the fuel tank 115 within the refueling aircraft 110 through the boom force absorber assembly 140, through the refueling boom 114, and into the refueling receptacle 126 of the receiving aircraft 120. During the refueling process, the boom force absorber assembly 140 may continue to absorb compression forces that may arise within the in-flight refueling assembly 130 due to the relative movement between the refueling aircraft 110 and the receiving aircraft 120. When refueling of the receiving aircraft 120, the controller 111 may disengage the refueling boom 114 from the refueling receptacle 126, and the refueling process is completed.

Embodiments of the present invention may provide significant advantages over the prior art. For example, because the boom force absorbing assembly 140 is configured to absorb both relatively high magnitude compression forces, as well as relatively lower magnitude forces that result from relatively normal, incidental contacts that occur in day-to-day aerial refueling operations, the in-flight refueling assembly 130 may result in less damage to the receiving aircraft 120. Incidental contacts between the refueling boom 114 and portions of the receiving aircraft 120, such as the fuselage, cockpit windows, antenna, and other portions of the receiving aircraft 120 in the vicinity of the refueling receptacle 126, may be absorbed by the boom force absorption assembly 140, resulting in reduced repair costs and reduced downtime of the receiving aircraft 120. Furthermore, safety of the in-flight refueling assembly 130 may be improved because the boom force absorber assembly 140 absorbs not only relatively high magnitude forces, but also relatively lower magnitude forces.

It will be appreciated that various embodiments of methods and systems for in-flight refueling in accordance with the present invention may be conceived, and that the invention is not limited to the particular embodiments described above. For example, the boom force absorber assembly 140 may be located at any suitable position to absorb compression forces exerted on the refueling boom 114, and is not limited to the particular position described above and shown in FIG. 2.

Figure 6:
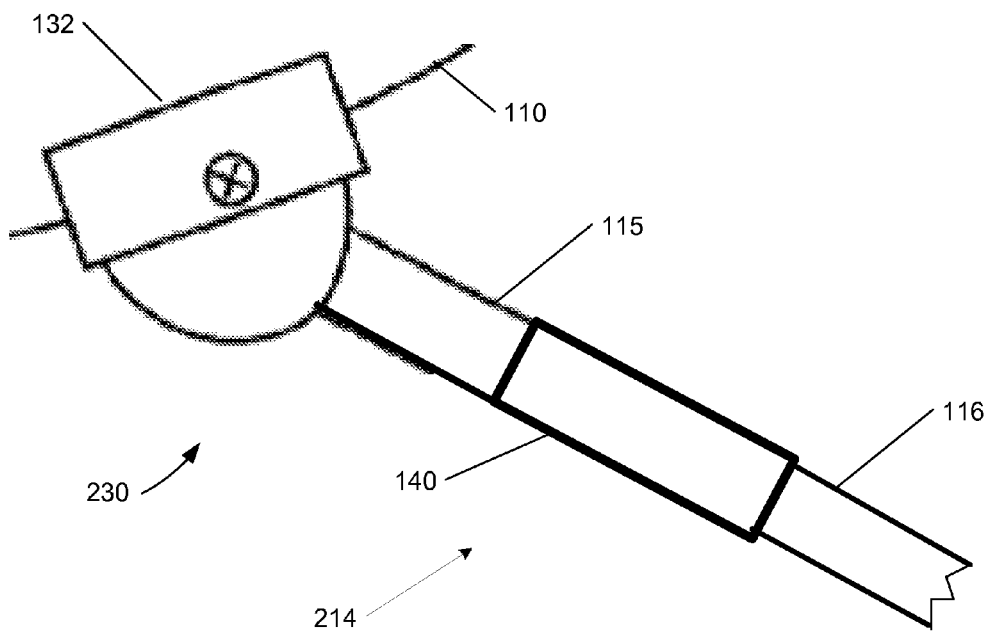
FIGS. 6 and 7 are enlarged side elevational views of in-flight refueling assemblies in accordance with additional embodiments of the invention.
Figure 7:
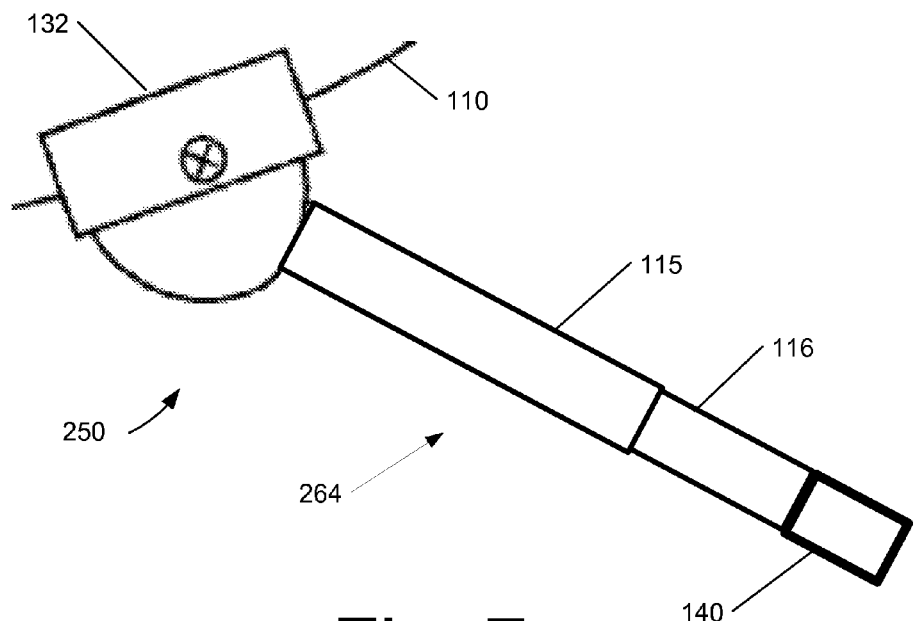

FIG. 6 is an enlarged side elevational view of an in-flight refueling assembly 230 in accordance with another embodiment of the invention. In this embodiment, the boom force absorber assembly 140 is spaced apart from the gimble assembly 132 and is situated along the length of about refueling boom 214. More specifically, the boom force absorber assembly 140 is disposed between the base portion 115 and the extendable portion 116 of the refueling boom 214. Alternately, FIG. 7 shows an in-flight refueling assembly 250 in which the boom force absorber assembly 140 is positioned at a distal end of the refueling boom 264. Specifically, in the embodiment shown in FIG. 7, the boom force absorber assembly 140 is disposed at the distal end of the extendable portion 116 of the refueling boom 264. Of course, in further embodiments, the boom force absorber assembly 140 may be positioned at any location along the refueling boom, including anywhere along the length of the base portion 115, or the length of the extendable portion 116.

Various embodiments of boom force absorber assemblies may also be conceived in accordance with alternate embodiments of the present invention. For example, referring again to FIG. 3, in an alternate embodiment, the roles of the primary and insertion spring's 154, 152 may be reversed. The primary spring 154 may be configured to absorb relatively lower magnitude compression forces associated with incidental contacts between the refueling boom 114 and the receiving aircraft 120, and the insertion spring 152 may be configured to absorb relatively higher magnitude compression forces associated with potentially extreme conditions. Thus, incidental contacts that occur during normal day-to-day aerial refueling operations will compress the primary spring 154, and compression forces (overload or secondary forces) which exceed the relatively lower magnitude forces associated with incidental contacts will either partially or completely compress the primary spring 154 and will also begin to compress the insertion spring 152. In this way, such an alternate embodiment of the boom force absorbing assembly may be configured to absorb both relatively high magnitude compression forces, as well as relatively lower magnitude forces that result from normal, incidental contacts that occur in aerial refueling operations.

Figure 8:
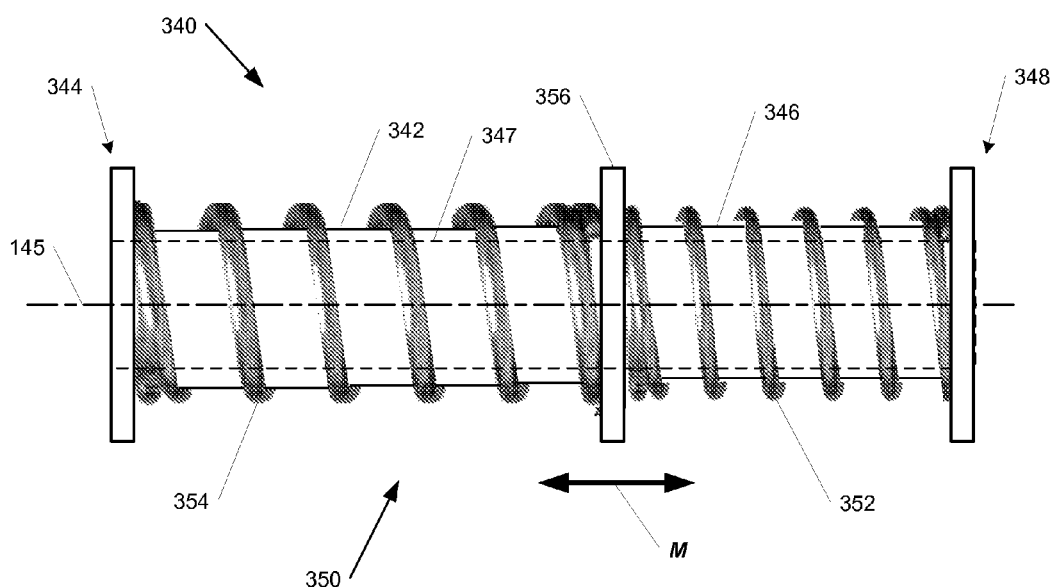
FIGS. 8 through 11 are side elevational views of boom force absorber assemblies in accordance with further embodiments of the invention.

As with almost every aerospace system, it may be desirable to reduce the weight of the boom force absorber assembly. FIG. 8 shows a side elevational view of a boom force absorber assembly 340 in accordance with another embodiment of the invention. In this embodiment, the boom force absorber assembly 340 includes a first conduit 342 having a first flange 344 configured to be coupled to the gimble assembly 132, and a second conduit 346 having a second flange 348 configured to be coupled to the refueling boom 114. The first and second conduits 342, 346 are coupled such that the second conduit 346 may move axially along the longitudinal axis 145 relative to the first conduit 342 (or vice versa) as depicted by double-headed arrow M. An internal passage 147 extends through the first and second conduits 342, 346.

As further shown in FIG. 8, the boom force absorber assembly 340 also includes a compressible assembly 350 having an insertion spring 352 disposed about the second conduit 346, and a primary spring 354 disposed about the first conduit 342. A load transfer plate 356 is disposed between the insertion spring 352 and the primary spring 354, and is configured to slideably move along the longitudinal axis 145 (arrow M) over one or both of the first and second conduits 342, 346. As described more fully above, the compressible assembly 350 is advantageously configured to absorb relatively high magnitude compression forces typically associated with potentially extreme or catastrophic events, as well as relatively lower magnitude forces that result from relatively normal, incidental contacts between the refueling boom 114 and the receiving aircraft 120 during aerial refueling operations. The boom force absorber assembly 340 may be lighter than other, previously-described embodiments (e.g. assembly 140 of FIG. 3) because the first and second housings 142, 146 have been eliminated.

In further embodiments, one or both of the coil springs 352, 354 of the compressible assembly 350 may be replaced (or augmented) with other types of compression absorbing devices. In the embodiment shown in FIG. 9, for example, a boom force absorber assembly 440 in accordance with another alternate embodiment includes a compressible assembly 450 having a plurality of shock absorbers 452 disposed about the second conduit 346 and coupled between the second end 348 and the load transfer plate 356. The plurality of shock absorbers 452 may be concentrically disposed about the second conduit 346.

In some embodiments, the plurality of shock absorbers 452 are equi-distally spaced about the second conduit 346. The shock absorbers 452 may be pneumatic, hydraulic, magnetic, or any other suitable type of shock absorbers. In some embodiments, the shock absorbers 452 may be of a passive type, such as the type typically found in an automotive suspension system. Alternately, the shock absorbers 452 may be coupled to a fluid supply 457 via one or more supply lines 459, and may be actively controlled by a control component (e.g. the controller 111).

Figure 9:
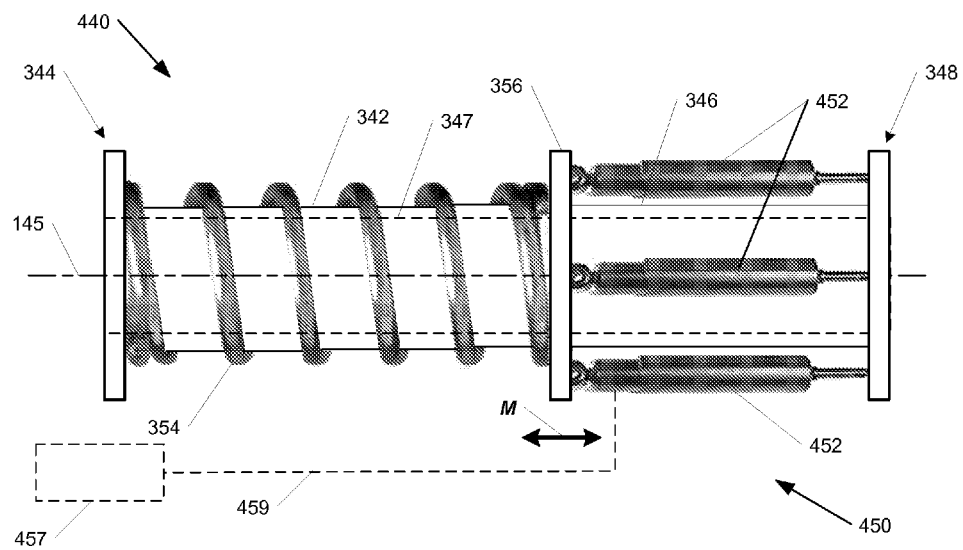

In one particular aspect of the embodiment shown in FIG. 9, the boom force absorber assembly 440 is configured such that the plurality of shock absorbers 452 cooperatively absorb the relatively lower magnitude forces that result from normal, incidental contacts between the refueling boom 114 and the receiving aircraft 120, and the primary spring 454 absorbs the relatively higher magnitude compression forces that are greater than those caused by normal, incidental contacts (e.g. of the type associated with extreme or catastrophic events). In an alternate aspect, the roles of the shock absorbers 452 and the primary spring 454 are reversed such that the plurality of shock absorbers 452 absorb the relatively higher magnitude compression forces, and the primary spring 454 absorbs the relatively lower magnitude compression forces associated with normal, incidental contacts.

Figure 10:
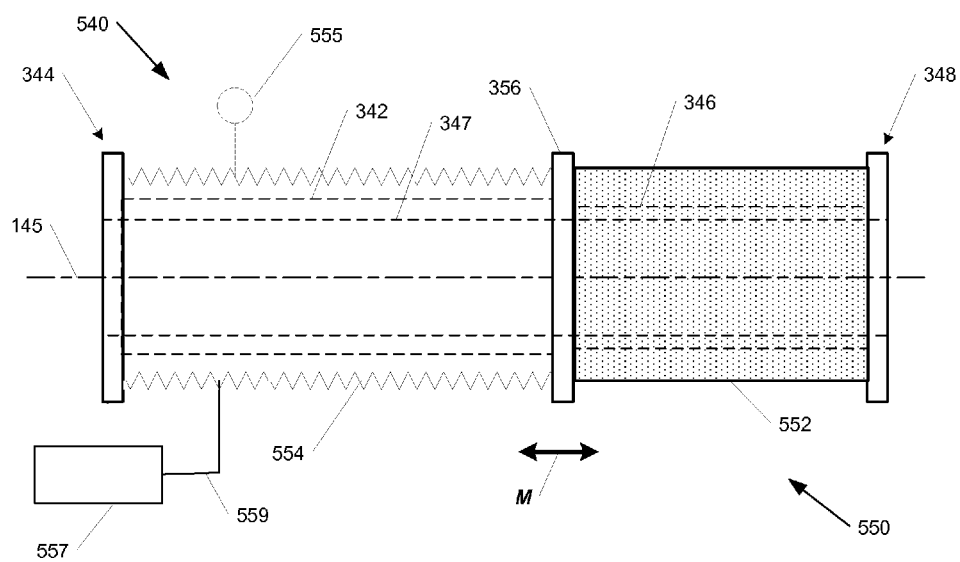

FIG. 10 shows a side elevational view of a boom force absorber assembly 340 in accordance with another embodiment of the invention. As in the embodiments described above with respect to FIGS. 8 and 9, the boom force absorber assembly 540 includes a first conduit 342 having a first flange 344 configured to be coupled to the gimble assembly 132, and a second conduit 346 having a second flange 348 configured to be coupled to the refueling boom 114. The first and second conduits 342, 346 are coupled such that the conduits 342, 346 may move axially relative to each other along the longitudinal axis 145 (arrow M). The internal passage 147 extends through the first and second conduits 342, 346.

In the embodiment shown in FIG. 10, the boom force absorber assembly 540 includes a compressible assembly 550 having a resilient member 552 disposed about the second conduit 346, and an inflatable member 554 disposed about the first conduit 342. The resilient member 552 may be an approximately tubular member, and may be formed of any suitable resilient material, including rubber or other elastomeric materials, fiberous materials (e.g. cotton or wood-based materials), or any other suitable materials or combinations of materials. A load transfer plate 356 is disposed between the resilient member 552 and the inflatable member 554, and is configured to slideably move over one or both of the first and second conduits 342, 346 along the longitudinal axis 145 (arrow M). The inflatable member 554 is coupled to a controllable fluid supply 557 via one or more supply lines 559, and may be actively controlled by a control component (e.g. the controller 111).

The compressible assembly 550 is configured to absorb both relatively high magnitude compression forces typically associated with potentially extreme events, as well as relatively lower magnitude forces that result from relatively normal, incidental contacts during aerial refueling operations. More specifically, as the controller 111 guides the refueling boom 114 into engagement with the refueling receptacle 126 of the receiving aircraft 120, incidental contacts between the refueling boom 114 and portions of the receiving aircraft 120 create relatively lower magnitude compression forces which are absorbed by the resilient member 552 of the boom force absorption assembly 540.

In the event that a greater-than-nominal compression force is experienced by the boom force absorption assembly 540, the resilient member 552 may become mostly or completely compressed, and the greater-than-nominal compression force acting through the load transfer plate 156 may begin compressing the inflatable member 554. As the pressure within the inflatable member 554 increases, a fluid medium within the inflatable member 554 (e.g. pneumatic or hydraulic) may be expelled from the inflatable member 554. In some embodiments, the fluid medium may be expelled through the supply line 559 and into the fluid supply 557. Alternately, the fluid medium may be expelled from a pressure relief valve 555 fluidly coupled to the inflatable member 554. Thus, the inflatable member 554 absorbs the greater-than-nominal compression force. Once the compression forces on the boom force absorber assembly 540 are relieved, the inflatable member 554 may be re-inflated by the fluid supply 557 via the supply line 559 (e.g. by the controller 111) to a nominal operating pressure for continued aerial refueling operations.

Figure 11:
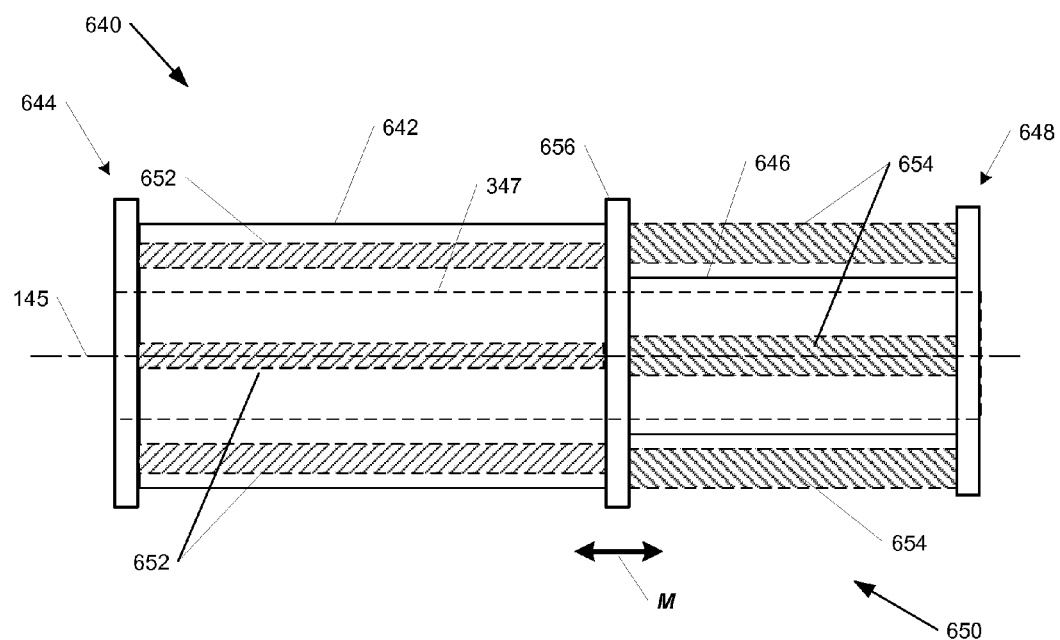

FIG. 11 shows a boom force absorber assembly 640 in accordance with yet another embodiment of the invention. In this embodiment, the boom force absorber assembly 640 includes a first housing 642 having a first end 644 configured to be coupled to the gimble assembly 132, and a second housing 646 having a second end 648 configured to be coupled to the refueling boom 114. The first and second housings 642, 646 are moveably coupled and are configured to move axially relative to each other along the longitudinal axis 145 (arrow M). The internal passage 147 extends through the first and second housings 642, 646.

As further shown in FIG. 11, the boom force absorber assembly 640 includes a compressible assembly 650 having a plurality of first springs 652 circumferentially disposed about an inner peripheral surface of the first housing 642, and a plurality of second springs 654 circumferentially disposed about an outer peripheral surface of the second housing 646. A load transfer plate 656 is disposed between the plurality of first springs 652 and the plurality of second springs 654. The load transfer plate 656 is configured to slideably move over one or both of the first and second housings 642, 646 along the longitudinal axis 145 (arrow M).

As in the previously-described embodiments, the boom force absorption assembly 640 is configured to absorb both relatively high magnitude compression forces typically associated with potentially extreme events, as well as relatively lower magnitude forces that result from relatively normal, incidental contacts during aerial refueling operations. More specifically, as incidental contacts between the refueling boom 114 and portions of the receiving aircraft 120 create relatively lower magnitude compression forces, such incidental forces are absorbed by the plurality of second springs 654. In the event that a greater-than-nominal compression force is experienced, the plurality of second springs 654 reach a first limit and become mostly or completely compressed. The greater-than-nominal compression force acting through the load transfer plate 156 then begins to compress the plurality of first springs 652. The plurality of first springs 652 may be configured to absorb greater-than-nominal compression forces up to a second limit. In some embodiments, the second limit is at least one order of magnitude greater than the first limit.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An aerial refueling system, comprising:
   a first conduit portion moveably coupled to a second conduit portion and moveable relative to the second conduit portion along a longitudinal axis; and
   a force absorbing assembly operatively coupled to the first and second conduit portions and having:
   a first absorber portion for absorbing loads resulting from incidental contact during refueling, the first absorber portion configured to compress when subjected to a compression force having a longitudinal component at least approximately aligned with the longitudinal axis, the longitudinal component tending to urge the first conduit portion toward the second conduit portion and causing absorption of at least a portion of the longitudinal component by the first absorber portion until the longitudinal component reaches a first force limit; and a second absorber portion for absorbing substantially greater loads during refueling, the second absorber portion operatively engaged with the first absorber portion and configured to compress when the longitudinal component exceeds the first force limit.

2. The system of claim 1, wherein the first absorber portion comprises a first coil spring disposed about the first conduit portion, and the second absorber portion comprises a second coil spring disposed about the second conduit portion.

3. The system of claim 1, wherein the first absorber portion comprises a plurality of coil springs disposed about the first conduit portion, a first one of the plurality of coil springs being configured to approximately match an anticipated insertion force of a refueling receptacle of a receiving aircraft, and a second one of the plurality of coil springs being configured to provide a forced refueling force to maintain contact with the refueling receptacle.

4. The system of claim 1, wherein the first and second conduit portions form an internal passage, and wherein at least one of the first and second absorber portions comprises at least one of a coil spring disposed about the internal passage, a plurality of fluidic shock absorbers concentrically disposed about the internal passage, a plurality of springs concentrically disposed about the internal passage, a tubular resilient member concentrically disposed about the internal passage, and an inflatable member concentrically disposed about the internal passage.

5. The system of claim 1, wherein the first absorber portion comprises a plurality of shock absorbers disposed about the first conduit portion, the plurality of shock absorbers being operatively coupled to a fluid supply.

6. The system of claim 1, wherein the second absorber portion comprises an inflatable member disposed about the second conduit portion, the inflatable member being operatively coupled to a fluid supply.

7. The system of claim 1, further comprising an annular plate disposed between the first and second absorber portions, the annular plate being moveable along the longitudinal axis.

8. The system of claim 1, wherein the second absorber portion is further configured to compress until the longitudinal component reaches a second force limit, the second limit being greater than the first limit.

9. The system of claim 8, wherein the first limit is an anticipated maximum nominal force created by an incidental contact during an aerial refueling operation, and the second limit is an anticipated extreme force created by a non-incidental contact.

10. An aerial refueling system, comprising:
an aerial boom; and
a force absorbing assembly coupled to the boom, the assembly including a first compressible portion for absorbing loads resulting from incidental contact of the boom during refueling, and a second compressible portion for absorbing substantially greater loads on the boom during refueling;
wherein the first portion is fully compressed as the second portion is absorbing the substantially greater loads.

11. An aerial refueling aircraft, comprising:
a fuselage;
a fuel tank within the fuselage; and
the aerial refueling system of claim 10, wherein the aerial boom is in fluid communication with the fuel tank.

12. The aircraft of claim 11, wherein the aerial boom includes:
a base portion; and
an extendible portion
wherein the force absorbing assembly further includes:
a first conduit housing coupled to a second housing and moveable relative to the second housing along a longitudinal axis; and
wherein the first compressible portion is located within the first housing and is configured to compress when subject to a compression force having a longitudinal component at least approximately aligned with the longitudinal axis, the longitudinal component tending to urge the first housing toward the second housing and causing absorption of at least a portion of the longitudinal component by the first compressible portion until the longitudinal component reaches a first limit; and
wherein the second compressible portion is located within the second housing and is configured to compress when the longitudinal component exceeds the first limit.

13. The aircraft of claim 12, wherein the force absorbing assembly further includes an annular plate disposed between the first and second compressible portions, the annular plate being moveable along the longitudinal axis.

14. The aircraft of claim 12, wherein the force absorbing assembly is coupled to the base portion of the aerial boom.

15. The aircraft of claim 12, wherein the force absorbing assembly is coupled between the base portion and the extendible portion of the aerial boom.

16. The aircraft of claim 12, wherein the force absorbing assembly is coupled to a distal end of the extendible portion of the aerial boom.

17. The aircraft of claim 12, wherein the refueling boom assembly further comprises a gimble assembly coupled to the fuselage and one of the base portion and the force absorbing assembly.

* * * * *